Oct. 23, 1962 G. DIRKS 3,060,414

TRANSFER AND STORAGE OF DIGITAL DATA SIGNALS

Filed Oct. 31, 1958 2 Sheets-Sheet 1

INVENTOR
GERHARD DIRKS
BY Joseph Weingarten
ATTORNEY

TRANSFER AND STORAGE OF DIGITAL DATA SIGNALS

Filed Oct. 31, 1958 2 Sheets-Sheet 2

INVENTOR
GERHARD DIRKS
BY Joseph Weingarten
ATTORNEY

United States Patent Office 3,060,414

Patented Oct. 23, 1962

3,060,414
TRANSFER AND STORAGE OF DIGITAL DATA SIGNALS

Gerhard Dirks, Frankfurt am Main, Germany
(12120 Edgecliff Place, Los Altos Hills, Calif.)

Filed Oct. 31, 1958, Ser. No. 771,126
Claims priority, application Great Britain Nov. 6, 1957
16 Claims. (Cl. 340—174.1)

This invention relates to apparatus for transferring data from an input source to a cyclically operating storage device.

In general the rate at which data is provided by an input device is different from the rate at which data is accepted by the main data storage device of a computer or other data processing machine. For example, the usual type of magnetic drum storage accepts data items at a considerably higher rate than they can be read serially from a punched card, or a punched tape. Consequently, it is usual to provide a buffer storage which can hold a considerable number of data items, for example, all those relating to one card, between the input device and the main storage. This buffer store accepts data items from the input device at the appropriate speed and blocks of data items are then read from the buffer store to the main store at the normal operating speed of the main store. The equipment which is required to provide such a buffer store adds considerably to the complexity and cost of the storage system.

It is an object of the invention to provide an arrangement for transferring serially occurring data items from an input source to a cyclically operating storage device, utilising a buffer store which stores only one data item.

It is a further object of the invention to record a group of consecutively occurring data items in the storage device during a single cycle, the items being recorded in non-adjacent storage positions and during a subsequent cycle to record a second group of data items in storage positions which are interlaced with those storing the first group of items.

According to the invention, data transfer apparatus includes means for sequentially sensing a plurality of characters forming a block of data recorded on a data bearing record, a cyclic access storage device with a plurality of character storage positions, the storage device operating substantially synchronously with the character sensing and at least two cycles occurring during the sensing of a block of data, data transfer means interconnecting the sensing means with the storage device and timing means controlling the transfer means to effect transfer of characters sensed at corresponding times in successive cycles to adjacent storage positions to provide an interleaved storage pattern.

The invention will now be described, by way of example, with reference to the accompanying drawings, in which.

Figure 1:
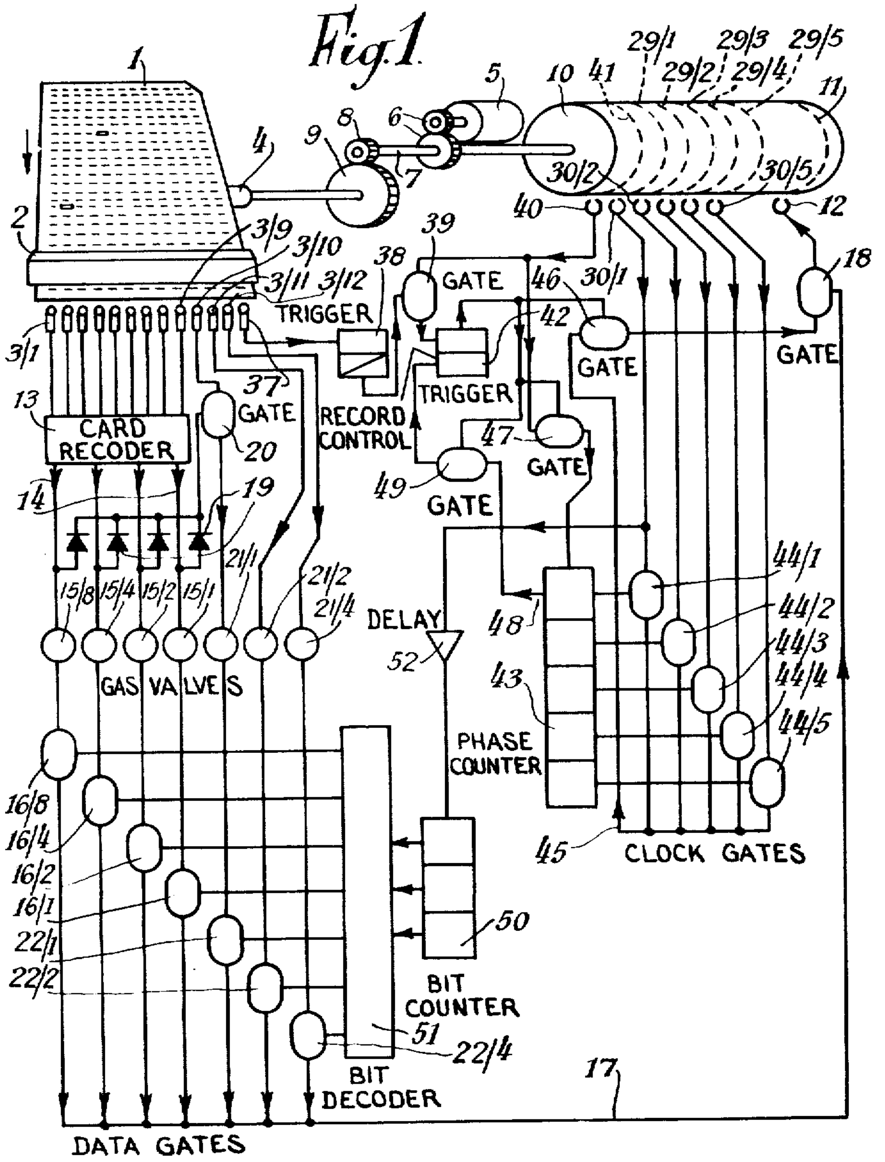
FIGURE 1 is a block schematic diagram of an arrangement for transferring data from a serially sensed punched card to a cyclically operating magnetic drum store.

Data recorded on a punched record card 1 (FIGURE 1) is sensed column by column by means of a light source 2, and a group of photo-electric cells 3/1 to 3/12. The card 1 is fed at a uniform speed in the direction of the arrow by a feeding device represented schematically by a feeding roller 4. The roller 4 is driven by a motor 5 through gears 6, a shaft 7 and gears 8 and 9. Also mounted on the shaft 7 is a magnetic storage drum 10. The ratio between the gears 8 and 9 in relation to the diameter of the roller 3 is such that the drum 10 makes five revolutions during the sensing of the card 1 by the cells 3.

Data is represented on the card in the usual manner by one of the conventional statistical codes in which an item of data is represented by one or more perforations in predetermined positions in each card column, these positions being known as index points. Twelve index points are provided, known respectively as Y, X, O and 1 to 9. Thus, a digit value is represented by a hole punched in one of the index point positions "O"–"9," which are sensed by the cells 3/10 to 3/1 respectively. An alphabetic character or symbol is represented by a hole punched in one of the index point positions "1"–"9" in combination with a hole punched in the "O" position, or the "X" or "Y" positions, which are sensed by the cells 3/11 and 3/12. Under these conditions the positions O, X and Y are termed zone positions. Thus a hole in the "O" index point position may represent the digital value zero. if it is the only hole in a column, or it may form the zone part of the representation of an alphabetic character.

The data sensed from the card is recorded in a data track 11 on the storage drum 10 by a recording head 12. The data is recorded on the drum in binary-decimal coded form, so that the sensed data has first to be converted to this code. The cells 3/1 to 3/9 are connected to the input of a card re-coder 13 which may, for example, consist of a diode or rectifier matrix. Matrix coding arrangements of this kind are described in an article entitled "The Selenium Rectifier in Digital Computer Circuits" by A. D. Booth and A. D. Holt in "Electronic Engineering" for August 1954. Energisation of any one of these cells due to the sensing of a hole causes the re-coder 13 to energise an appropriate combination of output lines 14 to represent the sensed digit in binary-decimal code. The output lines 14 are connected to gas-filled valves 15/1, 15/2, 15/4 and 15/8 which correspond to the code elements 1, 2, 4, and 8. Energisation of an output line 14 causes firing of the corresponding gas valve 15 by means of conventional circuit connections. The firing of a gas-valve 15 controls energisation of the recording head 12, to record a signal on the drum, through an associated data gate 16, a line 17 and a gate 18. The detailed operation of the gates 16 and 18 will be explained hereinafter.

The digit value zero is represented by the absence of all code elements in the binary-decimal code, so that the cell 3/10 is not connected to the re-coder 13. However, a hole punched in the "O" index point position may represent the zone part of an alphabetic character and, if so, it must cause an appropriate recording on the storage drum 10. For this purpose the "O" index point is given zone code value one. A gate 20 receives signals from the cell 3/10, and a control voltage from the output lines 14 of the re-coder through diodes 19. The gate 20 is opened only if one or more of the output lines 14 has been energised, so that a gas valve 21/1 will receive an output signal from the gate 20 only if a hole in the "O" index point position has been sensed, and one or more of the output lines 14 has been energised owing to the sensing of a hole in one of the index point positions "1" to "9." The output from the gas-valve 21/1 controls a gate 22/1 which is similar to the gate 16/1.

The index point positions "X" and "Y" are given the zone code values two and four respectively for the purpose of recording them on the storage drum 10. The cells 3/11 and 3/12 are directly connected to gas-valves 21/2 and 21/4, respectively, so that these gas valves are fired whenever the corresponding photocell is energised by the sensing of the hole. The gas valves 21/2 and 21/4 control gates 22/2 and 22/4 which correspond to the gates 16/2 and 16/4.

Figure 2:
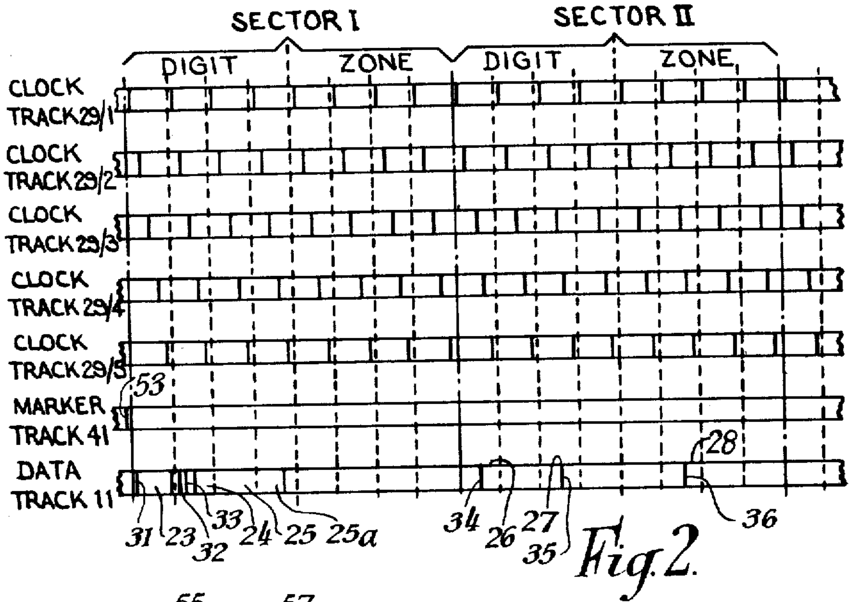
FIGURE 2 is a schematic illustration of the signals recorded in various tracks of the magnetic drum store.

The card 1 has eighty columns of data so that sixteen columns of the card are sensed during each of the five revolutions of the storage drum. The track 11 of the storage drum in which the sensed data is recorded, may be regarded as being divided in effect into sixteen sectors corresponding to the sixteen columns sensed during one revolution of the drum. Each sector is divided into eight sub-sectors such as the sub-sectors 23, 24, 25 and 25*a* of sector I and 26, 27 and 28 of sector II, as shown in FIGURE 2. The first four sub-sectors in each sector are used for recording digit values and the second four sub-sectors are used for recording zone values.

Each sub-sector corresponds to one of the binary code elements and comprises five signal storage positions. For example, all the signals recorded in the sub-sector 23 represent the binary code elements one relating to digit values, whereas those in the sub-sector 24 represents the code element two and those in the sub-sector 25*a* represent the code element eight.

The timing of the signals recorded on the drum is controlled by clock pulses derived from five clock tracks 29/1 to 29/5 which are read by reading heads 30/1 to 30/5. It will be seen from FIGURE 2 that each clock track has one signal recorded in each sub-sector, but that the signals recorded in each clock track differ in phase or position from those in the other clock tracks, so defining five different times of recording within each sub-sector, corresponding to the five storage positions of each sub-sector. Clock pulses derived from the clock track 29/1 are used to control recording during the first drum revolution of each card sensing cycle. Thus data sensed from the first sixteen columns of the card is recorded by signals in the first storage position in each of the sub-sectors. Clock pulses from the track 29/2 are used during the second revolution of the drum so that data from the second group of sixteen columns is represented by signals recorded in the second storage position in each sub-sector. Similarly the remaining three clock tracks are used for the other three revolutions of the drum occurring during the sensing of a card.

The data is recorded on the drum in fully serial form. Thus if column eighty of the card is sensed first and this column contains a hole in the "3" index point position (i.e. digit code elements 1 and 2 in the binary code), then a signal 31 will be recorded in the first storage position of the sub-sector 23 and a signal 32 will be recorded in the first storage position of the sub-sector 24. The data sensed from column seventy-nine of the card is stored in sector II and if this column contains only a hole in the "0" index point position then no signals will be recorded in the first storage position of the digit sub-sectors of sector II. Data from succeeding card columns will be stored in a similar way in the successive sectors. After one complete revolution of the storage drum 10, column sixty-four of the card is being sensed and this will be stored in sector I. However, the recording is now under control of clock pulses generated by the clock track 29/2, so that if this column contains a hole in the "2" index point position then a signal 33 will be recorded in the second storage position of sub-sector 24.

After a card has been completely sensed, sector I will contain signals representing the data from columns eighty, sixty-four, forty-eight, thirty-two and sixteen, the sector II will represent columns seventy-nine, sixty-three, forty-seven, thirty-one and fifteen and so on for the other sectors. The data from the card columns is therefore recorded in an interlaced manner in the track 11. Moreover, the representations of the individual characters are also interlaced since each sub-sector contains all the signals of a particular code element value for the five columns recorded in the corresponding sector.

Signals will be recorded in both the digit and zone groups of sub-sectors if a particular column contains an alphabetic character. For example, the sub-sectors 26 and 27 of sector II have signals 34 and 35 recorded in the third storage position representing a digit value of "5," but there is also a signal 36 recorded in the third storage position of sub-sector 28 which represents an X zone perforation, since these signals are all in the third storage position of sector II they were recorded under control of data sensed from column forty-seven of the card and this column must have had perforations in the "5" and "X" index point positions.

The card 1 is fed in synchronism with the rotation of the drum 10. That is to say, the position of the card in relation to the drum is such that as the first column (column eighty) is about to be sensed the drum is positioned so that sector I is about to pass under the recording heads. In order to compensate for minor variations in the feeding of a succession of cards, the recording of data is initiated by the card itself. As the card is fed towards the sensing position the leading edge interrupts the light reaching a photo-cell 37, from the source 2. The output signal from the cell 37 is fed to a mono-stable flip-flop 38 to switch it on. The flip-flop controls a gate 39 which is open as long as the flip-flop is on. The gate 39 receives signals from a reading head 40 which senses a marker track 41 of the storage drum 10. The track 41 contains a single signal 53 (FIGURE 2), so positioned that it is sensed after the completion of recording in sector XVI and before the commencement of recording in sector I, providing an indication of the end of each revolution of the drum. The first end-of-revolution pulse to be generated by the head 40, after the flip-flop 38 has been switched on, is passed by the gate 39 to the input of a bistable record control flip-flop 42, to switch this flip-flop on. This flip-flop controls the supply of clock pulses to the recording circuits and remains on until the card has been completely sensed.

The monostable flip-flop 38 is of conventional form and has a time constant sufficient to allow for the minor variations in presentation of the first column at the sensing station due to feeding variations from card to card caused for example by card slip during feeding. It will be appreciated that the provision of a small capacity buffer in series with the sensing cells will allow card feeding out of synchronism with the drum rotation. For example, if a five-stage buffer is used, data may be read from the card five columns in advance of the passage of the appropriate storage sectors on the drum past the recording head. Although this re-introduces a buffer store between the card reader and the drum, the buffer in this case is considerably smaller and less costly than is the case when the buffer is required to accept data read from a whole card to be retransmitted at a higher speed to the drum, for example.

The bistable flip-flop 42 is a conventional two state trigger circuit of known form and is reset to its initial state after the card has been sensed in a manner to be described.

The selection of the correct phase of clock pulse for each revolution of the drum is controlled by a phase counter 43 and five clock gates 44/1 to 44/5. Each of the gates 44/1 to 44/5 receives clock pulse signals from the corresponding heads 30/1 to 30/5. The phase counter 43 consists of a conventional five-stage ring counter. In the zero condition of the counter the stage which controls the gate 44/1 is on, so that clock pulses generated by the head 30/1 are passed by the gate and are fed via line 45 to the input of a gate 46. When the record control flip-flop 42 is switched on it opens the gate 46 and allows the clock pulses on the line 45 to pass through the gate to the input of gate 18.

The phase counter 43 is stepped on by end-of-revolution pulses from the head 40 which are passed by a gate 47 held open by the record control flip-flop 42. Hence at the end of the first revolution of the drum the phase counter is stepped on one stage closing the gate 44/1 and opening the gate 44/2. The outputs of the gates 44/1 to 44/5 are connected in common to the line 45 so that during the second revolution of the drum the gate 18 receives clock pulses generated by the head 30/2 sensing the track 29/2. In a similar way the gates 44/3, 44/4 and 44/5 are operative during the third, fourth and fifth revolutions, respectively, of the storage drum.

Since the function of the phase counter is merely to apply a signal to the gates 44 in succession, it is apparent that other devices may be used for this purpose. For example, a five-output cold cathode counting tube or a shifting register arranged as a loop in which one stage is initially set to a predetermined state to provide an output. Shifting pulses derived from the gate 47 will then cause this condition to be transferred along the register, each stage providing the output to a different one of the gates 44 in turn.

The end-of-revolution pulse which occurs at the end of the fifth revolution of the drum returns the phase counter 43 to the zero condition with the first stage on. The switching on of the first stage produces a pulse on a line 48 connected to the input of a gate 49, which is open when the record control trigger 42 is on. The gate 49 passes the pulse on the line 48 to the input of the record control trigger 42 to switch it off, thus closing the gates 46 and 47 so that the supply of pulses to the gate 18 and to the counter 43 is cut off.

Instead of using five differently timed clock tracks a single clock pulse train may be fed in common to five gates, the outputs of the gates being connected to the line 45 through delay circuits providing different time delays. Alternatively, a single clock pulse train may be fed to a tapped delay line, the inputs to the gates 44 being connected to the taps on the delay line instead of to the heads 30, the delay between each tapping point being equal to the required time difference between clock phases. In either case the gates are rendered operative in sequence under control of the storage drum.

The binary-decimal representation of each sensed digit provided by the pattern of fired gas valves 15 and 21 is converted into serial form by the gates 16 and 22 which are controlled by a bit counter 50 through a bit decoder 51. The counter 50 consists of a conventional three stage binary counter, operated by clock pulses from the head 30/1, which are fed to it through a delay circuit 52. The circuit 52 is a delay line and provides a delay such that each clock pulse operates the counter as the end of the sub-sector in which that clock pulse occurs passes the head 12.

Each stage of the counter 50 provides a voltage output to the bit decoder 51, which may for example be a diode matrix, and this voltage appears on one of the output lines on the bit decoder in accordance with the count registered by the counter 50. At the start of a sector the counter 50 is registering zero and the resulting voltage output is such that the output line from the bit decoder which is connected to the gate 16/1 is energised. If the gas valve 15/1 is fired as a result of the sensing of a digit by the photo-cells 3, then both input lines to the gate 16/1 are energised and it will provide an output voltage on the line 17 to open the gate 18. Consequently the gate 18 will pass a clock pulse from the gate 46 to energise the head 12 to record a signal in the first sub-sector of a sector, for example, in the sub-sector 23 or the sub-sector 26. The positioning of the recorded signal within the sub-sector will depend upon which clock track phase is effective at that time, for example, the signal 31 was recorded under control of a clock pulse from the track 29/1, whereas the signal 26 was recorded under control of a clock pulse from the the track 29/3. Since the counter 50 is operated just before the beginning of each sub-sector the gate 18 is opened for a sufficient period to allow energisation of the head 12 under the control of any one of the five clock phases.

The bit counter and decoder serve to render the gates 16 and 22 operative in a pre-determined sequence. This function may be performed by a ring counter similar to the phase counter 43, or by other sequential switching devices such as a shifting register commutator. By altering the sequence in which the gates 16 and 22 are rendered operative, the code elements may be recorded in a different order, for example, in the reversed order 8, 4, 2, 1.

Since the decoder energises only one output line at a time none of the other gates 16 or 22 can be effective to control the gate 18 at the time when the gate 18 is being controlled by the gate 16/1. Just before the sub-sector 24 reaches the recording head 12 the counter 50 receives a clock pulse via the delay circuit 52 so that it is operated to register a count of one. This has the effect, through the decoder 51, of energising the line to the gate 16/2 and removing the energisation on the line connected to the gate 16/1. If the gas tube 15/2 has also been fired then the gate 18 will be opened by the gate 16/2 during the time that the sub-sector 24 is passing beneath the recording head 12. However, if the gas valve 15/2 is not fired only one input line of the gate 16/2 will be energised and the gate 18 will not receive an operating potential over the line 17, so that no signal will be recorded in the sub-sector 24. In a similar manner the bit decoder will apply an energising voltage to the gates 16/4 and 16/8 during the passage of the two following digit sub-sectors in the sector I. The next three clock pulses applied to the bit counter 50 cause the bit decoder to operate the gates 22/1, 22/2 and 22/4 in sequence, to permit recording of signals in the first three zone sub-sectors if the corresponding gas-valves 21 have been fired. The next input pulse to the counter 50 produces a registration of seven and none of the gate valves 16 or 22 is made operative by the decoder. Hence, no signals are recorded in the last zone sub-sector of each sector. The gas valves 15 and 21 are de-ionised during this period so that they are ready to be fired under control of the cells 3 in accordance with the data sensed in the next column of the card by the time recording starts in the next sector of the storage drum. Thus, the gas valves 15 and 21 act as a one character buffer store which enables each sensed character to be recoded and the code elements to be read out serially and recorded on the storage drum under control of the selected clock phase. The de-ionisation of the gas-valves may be controlled either by a signal derived from the bit counter when it registers seven or by a signal from a further sensing head which cooperates with a further track on the magnetic drum containing a signal at the end of each sector. The last clock pulse of the sector brings the counter 50 back to zero, ready for controlling recording in the next sector.

It will be apreciated that although the reading and recording heads are shown and described as being directly connected to the control apparatus, in practice conventional reading and recording amplifiers are interposed in the head circuits.

Figures 3, 4:
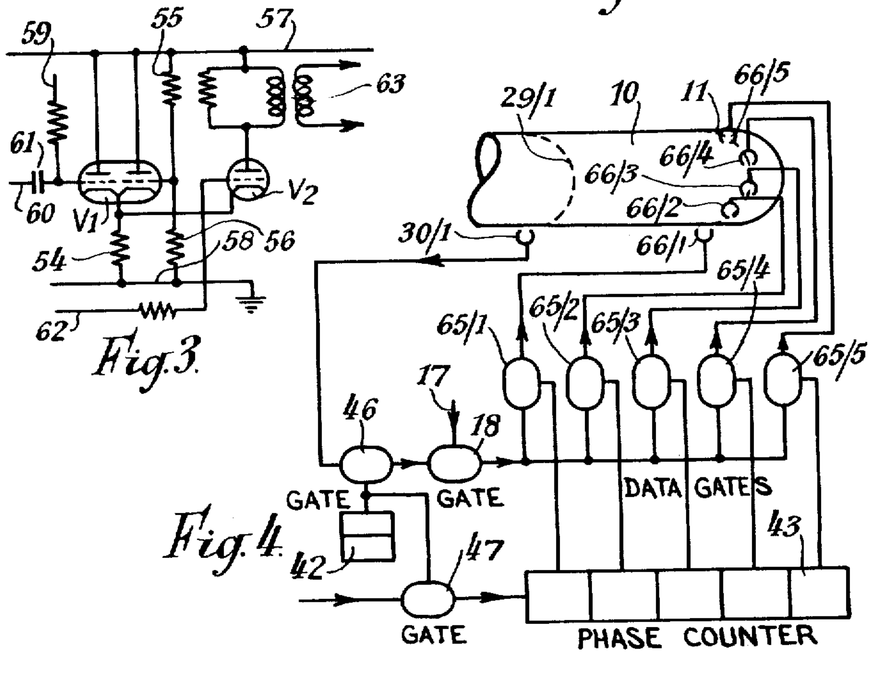
FIGURE 3 is a diagram of a gate circuit employed in the arrangement of FIGURE 1.
FIGURE 4 is a partial block schematic diagram showing a modified form of the arrangement of FIGURE 1.

FIGURE 3 shows a gate circuit of the type shown schematically by the gate 39 of FIGURE 1, in which a pulse output is derived from an input pulse from the head 40 under control of the flip-flop 38. The gate comprises a double triode V1 and a triode V2 having a common cathode resistor 54. The right hand side of V1 serves to stabilise the operating potential of the cathodes by virtue of a fixed potential applied to the grid from a potential divider consisting of resistors 55 and 56 connected between a positive supply line 57 and a ground line 58. The left-hand grid of V1 is connected to a positive bias line 59 and this section of V1 is therefore normally conducting so that the common cathode potential is high. The grid of the triode V2 is controlled from the flip-flop 38 over a line 62, but the normal cathode potential is such that whatever the condition of the flip-flop, V2, does not conduct. Negative-going pulses derived from the head 40 are applied over line 60 to the grid of the left hand section of V1 via capacitor 61. This section of V1 is therefore cut off and the cathode potential falls. Under these conditions, if the flip-flop 38 is switched on, a positive potential is applied to the grid of the triode V2 over the line 62 and the triode V2 conducts. An output pulse is then generated by means of a transformer 63, the primary winding of which is in the anode circuit of V2.

Except for the gates 16 and 22, the remaining gates shown in FIGURE 1 are similar to the gate 39. The gates 16 and 22 are modified to respond to potential levels at both inputs and the output circuits are also modified to provide a signal consisting of a potential at one of two predetermined levels. The modifications are as follows. The capacitor 61 is omitted so that the left-hand section of V1 is directly influenced by the potential applied over the line 57. In this case the line 60 is connected to one of the gas valves 15 or 21 and is at a low level when the appropriate gas valve is fired. The grid of V2 is conditioned by the bit decoder 51 and is high when the gate is selected, thereby allowing the triode to conduct. The anode of V2 is resistively coupled in the conventional manner to an inverter stage and the output from the inverter is applied to condition the gate 18.

The use of the same number of sub-sectors in both the digit and zone groups of a sector of the drum is particularly convenient when an interleaved track of the kind described is used in conjunction with an arithmetic unit in that the zone group of sub-sectors may be used for storing a second set of digital values. The use of sixteen sectors, each of which stores five characters is particularly suitable for use when the input data is derived from an eighty column punched card. However, with a fixed number of characters to be stored on the track the number of sectors may be increased, the number of characters per sector and the number of clock pulse phases being decreased, or vice versa. In the extreme case there is one character per sector so that there is no interleaving. It will be apparent that the ratio of the number of sectors to the total number of characters to be stored in a track determines the number of revolutions of the storage drum occurring for each card sensed. Thus either the drum speed or the number of sectors may be altered if it is desired to change the card sensing rate. The number of characters recorded in a track may be greater or less than eighty to suit the dimensions and packing density of the storage drum which is employed.

The arrangement described above utilises a buffer store having a capacity of one character only, although the effective operating speed is five times that of the data input source. The synchronisation between the drum and the card feed does not have to be held to a high degree of accuracy since the buffer store is scanned by clock pulses. As long as the buffer store is set in accordance with a sensed character when scanning occurs that character will be correctly recorded on the drum, so that variations in the time of sensing have no effect, if this condition is fulfilled.

Input media other than a punched card may be employed. For example, the gas-valves 15 and 21 may be fired under control of signals sensed from a magnetic or punched paper tape or from a magnetic area on a sheet or card. In the case of a continuous input medium such as a punched paper tape, the medium may be fed intermittently so that a block of data is sensed from the medium and recorded in the track 11, and the feed is then interrupted for a sufficient time to allow the contents of the track 11 to be transferred to a further register track on the drum or into another storage device before recording the next block of data. Alternatively, the output of the gate 18 may be switched in succession between two or more heads, a block of data being read from one track whilst the next block is being recorded in another track. The control of the feed, or of head switching may be derived from the phase counter.

Codes other than binary-decimal may be used for recording the information on the drum, for example, the 1, 2, 2, 4 code, the bi-quinary code or a direct decimal code may be used. In each case the number of digit sub-sectors within a sector is equal to the number of code elements.

The card recorder 13 may also have provision for calculating a parity check bit for each digit, which check bit is recorded in a sub-sector immediately following the group of digit sub-sectors to which it relates, by a gating arrangement similar to that used for recording in the digit sub-sectors. Alternatively provision may be made for checking the recorded data by utilising a pair of tracks for recording in the manner described in my co-pending application No. 24471/57.

In the form of the invention described above, the positioning of a signal within a sub-sector is controlled by the selection of the appropriate clock pulse phase. In a modified form of the invention (FIGURE 4) the positioning of the signal within a sub-sector is determined by selecting the appropriate one of five recording heads 66/1 to 66/5 co-operating with the track 11, a single clock pulse train being used. Clock pulse signals from the head 30/1 are fed directly to the input of the gate 46. The output of the gate 18 is fed to five gates 65/1 to 65/5 which are controlled individually by the phase counter 43 in the same way as the gates 44 were controlled by the phase counter in the previous embodiment. The five heads 66/1 to 66/5 are so spaced that when they are energised under control of the same clock pulse timing each of the heads records a signal in one of the five storage positions of a sub-sector. If the digit packing density on the drum is relatively high it may be difficult to construct a multiple head unit having five gaps within the space occupied by one sub-sector. In such a case the heads may be mounted with a distance between the gaps equal to one sub-sector plus one storage position, or some other convenient multiple, the signals being fed to the heads through suitable delay circuits so that the signals are timed to cause recording in the correct sub-sectors despite the relative physical displacement of the heads along the track 11.

It will be appreciated that the track 11 and the associated head 12 (FIGURE 1) from a cyclic access store and may therefore be replaced by other forms of cyclic access store. For example, the output of the gate 18 may be fed to the input of a re-circulating delay line store. The input of each gate 44 is derived from one of the stages of a five ring counter which is operated by the timing pulse source synchronised with the delay line, thus providing the necessary five trains of staggered pulses. The marker signal for operating the trigger 42 and the phase counter is produced by an additional counter operated by the timing pulse source and which produces one pulse for each cycle of the delay line. The necessary synchronisation between the delay line and the card feed may be secured by driving the card by a synchronous motor, the supply frequency being controlled by the timing pulse source.

I claim:

1. Data transfer apparatus comprising, in combination, sensing means for sensing a record card of the type having information represented by data characters arranged in columns, said sensing means sequentially sensing complete columns, means for feeding the record card past the sensing means column by column, a cyclic access storage device with a plurality of character storage positions, means for causing the storage device to operate substantially synchronously with the sensing means and causing at least two cycles to occur during the sensing of an entire card, data transfer means interconnecting the sensing means with the storage device, timing means controlling the transfer means to effect transfer of said characters, and means responsive to the completion of each cycle of the storage device to cause the timing means to generate a train of differently phased timing signals whereby characters sensed at corresponding times in successive cycles are stored in adjacent storage positions to produce an interleaved storage pattern with the bits of different characters recorded in adjacent positions in the corresponding bit times.

2. Apparatus as claimed in claim 1, in which the storage device has a magnetic data recording track divided into a number of recording sectors equal to the number of columns sensed during one revolution of the storage member, each sector being divided into a number of character storage positions equal to the number of revolutions occurring during the sensing of the record card.

3. Apparatus as claimed in claim 1, in which the data transfer means includes signal gating means controlled jointly by signals representing the characters to be stored and by signals in the timing train to produce output signals which are applied to a magnetic transducing head cooperating with the data track.

4. Apparatus as claimed in claim 3, in which each differently phased timing signal train is derived from a separate clock track recorded on the storage device.

5. Apparatus as claimed in claim 4, in which the means for producing differently phased timing signal trains includes a number of gates with a common output, each of the timing signal trains being applied to an input of one of the gates, and a counter which renders each of the gates operative in turn.

6. Apparatus as claimed in claim 5, in which the counter is operated by a signal derived from another track on the storage device, the signal occurring once per revolution.

7. Apparatus as claimed in claim 1, in which there are a number of spaced apart magnetic recording heads associated with the data track and the timing control means renders a different one of the heads effective on each cycle during the recording of information on a record card.

8. Apparatus as claimed in claim 7, in which the recording heads are rendered effective under control of a counter which is operated once for each revolution of the storage member occurring during recording of a record card.

9. Apparatus as claimed in claim 1, in which the data transfer means includes character storage means adapted to be set in response to the sensing of characters by the sensing means, with means for reading out sequentially, in synchronism with the rotation of the storage device, characters stored in the character storage.

10. Data transfer apparatus comprising means for sensing a record card to detect sequentially columns of data characters recorded thereon, means responsive to said sensing means for recoding the data character detected in each column of said card and providing recoded information signals in serial form, a rotatable drum having a recording surface, means for correlating movement of said drum with the sequential sensing of the columns of said card, said movement correlating means causing said drum to make a plurality of revolutions during the interval in which the entire card is sensed, a transducer for writing on said recording surface, a gate controlling said transducer, means for generating several series of timing signals during the sequential sensing of said card with the signals of one series shifted in phase relative to the signals of the other series, and means for applying said information signals to said gate, and means for successively applying said several series of timing signals to said gate to cause said transducer to be energized upon coincidence of a timing and an information signal.

11. Data transfer apparatus comprising means for sensing a record card to detect data characters recorded in columns thereon, the sensing means having a plurality of aligned devices to simultaneously sense a column of data characters, means responsive to said sensing means for recoding the detected data characters and providing information pulses in serial form, a rotatable drum having a recording surface, means for correlating movement of said drum with the sequential sensing of columns of data characters on said card, said movement correlating means causing said drum to make at least two revolutions while the entire card is sensed, a transducer for writing on said recording surface, a gate controlling energization of said transducer, means for generating several trains of timing pulses with the pulses in one train displaced from the pulses of the other trains by equal time intervals, and means for applying said timing pulses and said information pulses to said gate to cause said transducer to be energized upon coincidence of a timing pulse and an information pulse.

12. Data transfer apparatus comprising means for sensing a record card of the type having data characters arranged in columns, the sensing means having a plurality of aligned devices arranged to simultaneously sense a column of data characters, means responsive to said sensing means for recoding the sensed data characters and providing the recoded output on a plurality of parallel lines, means for sequentially sampling the parallel line output and providing a series of information pulses for each column of data characters, a rotatable drum having a magnetizable recording surface, means for correlating movement of said drum with sequential sensing of the columns of the record card, the movement correlating means causing the drum to make at least two revolutions during the interval in which the entire card is sensed, a transducer for writing on the recording surface, a gate controlling energization of the transducer, means for generating a train of timing pulses for each revolution of said drum, means for applying the timing pulses and the information pulses to the gate to cause the transducer to be energized upon coincidence of a timing pulse and an information pulse, and means responsive to a signal generated at the beginning of each revolution of said drum for causing a phase change in the subsequently generated train of timing signals, said phase change corresponding to the time interval between successive information pulses.

13. Data transfer apparatus comprising, in combination, record means having information recorded thereon represented by data characters comprising data bits; sensing means for sensing said record means; a cyclic access storage device having a plurality of character storage positions; recording means for recording information on said storage device; data transfer means interconnecting said sensing means with said recording means; and clock means controlling said data transfer means to record the data sensed from said record means on said storage device in interlaced fashion with corresponding bits of different characters recorded in different phase positions in the same bit time.

14. Data transfer apparatus comprising, in combination, record means having information recorded thereon represented by data characters comprising data bits and arranged in columns; sensing means for sequentially sensing said record means by columns; a cyclic access storage device having a plurality of character storage positions; driving means coupled to said record means and to said storage device for driving said storage device substantially in synchronism with the sensing of said record means; recording means for recording information on said storage device; data transfer means interconnecting said sensing means with said recording means; and clock means controlling said data transfer means to record the data sensed from said record means on said storage device in interlaced fashion with corresponding bits of different characters recorded in different phase positions in the same bit time, the number of bits recorded in each bit time and the phase positions of said bits depending upon the number of columns of data and said record means and the driving ratio of said record means and said storage device.

15. Data transfer apparatus comprising, in combination, record means having information recorded thereon represented by data characters comprising data bits and arranged in columns; sensing means for sequentially sensing said record means by columns; a cyclic access storage device having a plurality of character storage positions; driving means coupled to said record means and to said storage device for driving said storage device substantially in synchronism with the sensing of said record means in a manner whereby said storage device is rotated at least two revolutions during the sensing of said record means; recording means for recording information on said storage device; data transfer means interconnecting said sensing means with said recording means; and clock means controlling said data transfer means to record the data sensed from said record means on said storage device in interlaced fashion with corresponding bits of different characters recorded in different phase positions in the same bit time, the number of bits recorded in each bit time and the phase positions of said bits depending upon the number of columns of data on said record means and the number of revolutions of said storage device during the sensing of said record means.

16. Data transfer apparatus comprising, in combination, record means having information recorded thereon represented by data characters comprising data bits and arranged in columns; sensing means for sequentially sensing said record means by columns; a cyclic access storage device having a plurality of character storage positions; driving means coupled to said record means and to said storage device for driving said storage device substantially in synchronism with the sensing of said record means in a manner whereby said storage device is rotated at least two revolutions during the sensing of said record means; recording means for recording information on said storage device; data transfer means interconnecting said sensing means with said recording means; and clock means controlling said data transfer means to record the data sensed from said record means on said storage device in interlaced fashion with corresponding bits of different characters recorded in different phase positions in the same bit time, the number of bits recorded in each bit time and the phase positions of said bits depending upon the number of columns of data on said record means and the number of revolutions of said storage device during the sensing of said record means, each bit of a first plurality of characters being recorded in a first phase position in the corresponding bit times of each character storage position of said storage device during a first revolution of said storage device and each bit of a second plurality of characters being recorded in a second phase position next succeeding said first phase position in the corresponding bit times of each character storage position of said storage device during a second revolution of said storage device.

References Cited in the file of this patent

UNITED STATES PATENTS

| | | |
|---|---|---|
| 2,668,875 | Shepherd | Feb. 9, 1954 |
| 2,718,356 | Burrell et al. | Sept. 20, 1955 |
| 2,729,803 | Harrison | Jan. 3, 1956 |
| 2,845,609 | Newman | July 29, 1958 |
| 2,902,679 | De Phillipo et al. | Sept. 1, 1959 |
| 2,926,338 | Bensky | Feb. 23, 1960 |